May 19, 1959  M. A. RUDNER  2,887,526
FLUORO-CARBON CERAMIC AND GLASS PRODUCTS
Filed Feb. 26, 1952
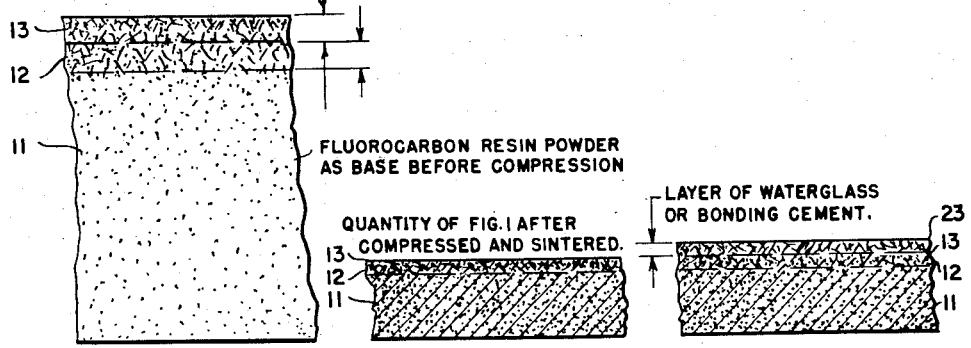
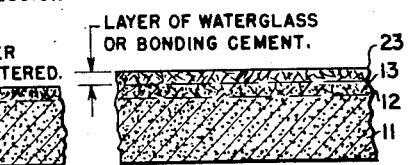
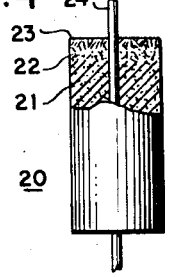
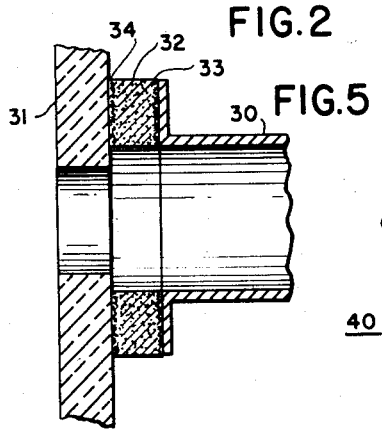
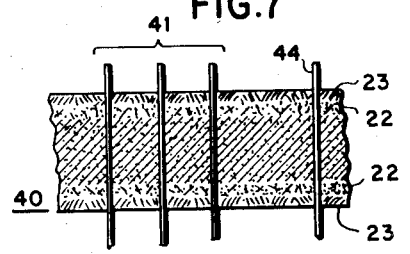
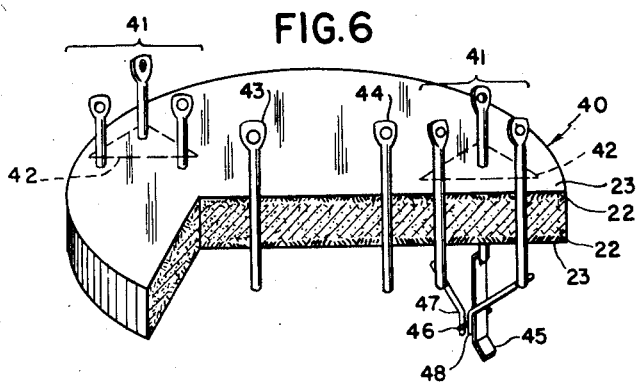
INVENTOR.
Merritt A. Rudner
BY
ATTORNEY

United States Patent Office 2,887,526
Patented May 19, 1959

2,887,526

FLUORO-CARBON CERAMIC AND GLASS PRODUCTS

Merritt A. Rudner, Camden, N.J., assignor to United States Gasket Company, Camden, N.J., a corporation of New Jersey Application February 26, 1952, Serial No. 273,508

6 Claims. (Cl. 174—152)

This invention relates to fluorocarbon resins, made up as raw material products from which commercial products may be made, or made up as completed articles of manufacture made from such resins, and the invention also relates to the processes for making the products and the articles.

Fluorocarbon resins are presently commercially available that have chemical, physical and electrical characteristics which make them suitable materials for many applications. One of those materials, polytetrafluoroethylene, is made and sold under the trademark "Teflon"; a second is polymonochlorotrifluoroethylene, sold under the trademark, Kel-F; a third is known by the trade-name "Florothene."

One of the striking physical characteristics of the Teflon resin, for example, is its ability to resist wetting and sticking. It is therefore impervious to water and moisture and to liquid acids and alkalis. The resistivity of all these materials is very high. The power factor is low. Those characteristics combine to make these materials excellent base materials for electronic applications.

These materials are provided in their raw state as powders, which may be formed and molded by pressure and heat to any simple shapes that may be desired. The materials may also be formed in bar or sheet stock and then machined to shape, where complex shapes are desired that may not be readily adapted to simple molding or extruding operations, for example.

Similarly, where a member made of a resin, such as Teflon, has been used as a spacing insulator, for example, suitable mechanical structures, and structural combinations, have been utilized to support the Teflon member as an insulator. In practically all cases where it has been so employed in the past, for its insulating characteristic, external means have been required to support the Teflon resin body as a spacing medium to provide the proper insulation in the region where such insulation was wanted. Because of the non-surface sticking characteristic of the resins, and Teflon specifically, it has been considered impossible, and, in fact, it has been impossible, heretofore, to provide a direct physical bonding between the Teflon resin body and any external material or member, either to support the Teflon resin, or to utilize the Teflon resin as a support for the external material or member.

In some applications, where it is desirable to utilize the insulating quality of the Teflon resin, it is also desirable to have a greater degree of rigidity. Such an application, for example, is one where the Teflon resin serves as a base to support several switch terminals which must be held in their original pre-determined positions during any switching operations. Ordinarily, Teflon resin has a slight resiliency, and used alone would have sufficient resiliency to permit the switch elements to move slightly with respect to each other during a switching operation. For such electrical uses, the flexibility of the Teflon resin is undesirable, and more rigidity is needed.

An object of this invention, therefore, is to provide a resin base with a modified physical characteristic, so the modified Teflon resin base will have sufficient rigidity to serve as a support for an electric switching structure whose co-operating elements will be held in pre-determined physical relationship during any switching operations.

In many mechanical applications, the physically inert quality of the resins makes it desirable, for example, as a covering for metal bases. In view of the physical characteristic of the Teflon resin, for example, which prevents the adhesion of other materials to the pure Teflon resin, that resin cannot be utilized directly, to be applied to a physical or metallic base, without the use of external supporting members, unless modified.

In a previous application filed April 16, 1951, Serial No. 221,197, I have disclosed a method whereby the fluorocarbon resins, Teflon particularly, may be modified in order to receive and accept a cohesive and integral layer of metal. In many applications where the Teflon resin may be desirable as a protective or supporting layer, the presence of a metal in the Teflon resin body or in the bonding region of the Teflon resin body may be undesirable.

Another object of this invention is therefore to provide a modified fluorocarbon resin body, especially the Teflon resin, so that it may be caused to readily adhere to another body, whether that body be metal, glass, ceramic or other material, or that such resin body when so modified will readily accept and hold some such similar other body, so a strong bond will be established and maintained between the modified fluorocarbon resin body and the external body to which it is to be joined.

Another object of the invention is to modify a fluorocarbon resin body such as Teflon, so that the main or basic portion of the resin body may retain its normal resilient characteristic, while at the same time a modified portion, preferably subjacent a selected external surface, may be caused to have the characteristics of substantial rigidity, and relative non-compressibility and hardness.

Another object of this invention is to provide a modified resin body, which shall have a characteristic, when so modified, that will permit the use of standard commercial cements and bonding agents to establish a bond between the modified body and some other external body.

In an application where a fluorocarbon base, such as Teflon resin, is to be used as an insulating support for electrical terminals of a switching device, particularly where the entire unit is of relatively small dimension, and several electrical contact elements are to be supported thereon, it is necessary that those contact terminals be maintained fixed at their pre-determined spacing during operation. Such a device might be, for example, the sealing cap or header for a hermetically sealed relay. The header accommodates several terminal conductors extending therethrough, in order to permit electrical connections to be made therethrough to the terminals of the coil or coils of the relay, as well as to the respective switch contacts controlled by the relay. In such an application the header dimensions are relatively small, and it is therefore essential that the terminals or wire conductors that are brought through the body of the header be maintained fixed in predetermined spaced relationship. It is therefore necessary, where a Teflon resin body is utilized as the base material for the header, that some provision be made to overcome the natural resiliency of the Teflon resin, and to somehow provide a rigidity that will maintain those contact terminal conductors in permanently fixed spaced relationship.

By the process involved in the present invention, the desirable insulating characteristics of the Teflon resin are retained, and at the same time, its resilient physical characteristics are modified to impart a rigidity to the Teflon resin where the conductors are to be fixedly supported.

A selected region of the Teflon resin body is modified by the addition of powdered material, for example a glass or ceramic ingredient mixed in with the Teflon powder, so that the final mixed quantity of material in that selected region, when subjected to the usual sintering operation, for the Teflon resin, will have the desired rigidity. That portion of the Teflon resin body formed by the addition of the glass or ceramic, by way of example, will then readily accept a layer of glass or ceramic which could not have been joined to the Teflon resin body itself. As a result, such a layer of powdered glass may be added to the sintered Teflon resin body by being superimposed upon such a glass-treated region of the Teflon resin body. Similarly, a ceramic material may be added as a powder to form a layer, where the original additive was a ceramic. In the case where glass is used to modify the selected region of the Teflon resin body, it is also possible to use a water glass to form the super-imposed layer, which is very easily applied, and in that arrangement the water glass on the modified Teflon resin base is then baked to reduce the water glass to a solidified glazed glass structure, that has the rigidity desired at the surface layer of the insulating Teflon body. Such a Teflon resin body, so modified, is then suitable to hold and retain the electrical conductors, such as wires, in fixed permanently spaced positions.

The manner in which a Teflon body may be prepared, in accordance with the principles of this invention, and the manner in which it may be utilized, for example, for one application briefly referred to herein, such as a header, and the various features and advantages of such a construction, are illustrated and described in the following specification, taken together with the accompanying drawings, in which, Figure 1 is a schematic view of a quantity of a fluoro-carbon resin material, for example Teflon resin, in its powdered state, with superposed layers of Teflon-resin-and-powdered-additive mixes in powder form, before the entire quantity is compressed and sintered;

Figure 2 is a similar view showing the relative section and height of the quantity of material of Fig. 1, as an integral body, after compression and sintering;

Figure 3 shows the structure of Fig. 2 after the sintering operation and after the application of a surface layer of water glass, or bonding cement;

Figure 4 shows a schematic section of an insulator consisting of a treated Teflon resin body, having its upper surface layer region modified and covered by a surface layer of a material to provide rigidity for supporting a metal conductor extending upward through the insulating body;

Figure 5 shows schematically an arrangement whereby a fluoro-carbon resin body, for example Teflon resin, in the form of an annular disc, has been modified to receive and accept a cement that will be suitable to bond the Teflon resin body to a glass surface and to a metallic surface, as illustrated, to show a metal pipe connected to a glass or ceramic support;

And Figures 6 and 7 are respectively top perspective, side sectional, and part plan views of a multi-terminal sealing header or cap, for use in sealing a can or receptacle for a relay, or other device, requiring a plurality of terminal connections.

In accordance with the principles of this invention, a portion of the resin body, such as the Teflon resin, is treated to serve as a transition region, by adding distributed powdered glass or powdered ceramic material to the Teflon powder to establish a mixture, in a region of the Teflon body directly subjacent a selected surface. That region varies gradually, but homogeneously, in increasing glass or ceramic content, from the main body zone of pure resin, or Teflon, to the actual surface layer. In that manner, the transition is made gradually from resin, or Teflon, to glass or ceramic, through a region of gradually increasing glass or ceramic content, to a planar region at the surface, at which the glass or ceramic content is the maximum that the resin can hold. As a result, the glass or ceramic surface that is exposed is then sufficient to receive and retain a glass or ceramic bond, such as, for example, a bond that may be formed by a water glass, or powdered glass, or ceramic powder heated to fusing temperature, or commercial cements for cementing wood, glass, or metal, that are either siliceous or resinous in character.

Although, in principle, the gradual variation and increase of glass or ceramic content provides an ideal disposition of that material, a commercially satisfactory structure is obtained where the proportion of the mixture is changed in two steps, instead of being varied continuously and gradually. Thus, in forming such a modified product, a quantity of Teflon molding powder, for example, may have superimposed thereon, as a layer, a quantity of a resin and glass powder, such as Teflon and glass powder, or Teflon and ceramic powder mix, in which the glass or ceramic content may vary within the range from 30 to 45 percent, by weight, and then a second layer of such a mixture superimposed, in which second layer the glass or ceramic content is 70 percent or more, by weight.

This arrangement of the materials is schematically illustrated in Fig. 1, where a body of Teflon powder, for example, is shown, covered and superposed by a first layer of a Teflon-glass or Teflon-ceramic mixture containing 40% glass powder or ceramic power by weight, as indicated by the layer 12, which is then covered by a second layer 13 of a mixture of Teflon and glass or ceramic containing about 70% of glass or ceramic powder by weight. Each of the two Teflon-glass or Teflon-ceramic mixtures 12 and 13 should be thoroughly mixed to provide a fairly homogeneous disposition of the glass or ceramic particles among the Teflon particles. For convenience the glass or ceramic contents will be referred to as 40% and 70% mixtures, but those percentages are not in themselves critical, since the proportions of the respective mixes may be somewhat varied, and a firm cohesive bond obtained in the body and at the surface.

The column of material as shown in Fig. 1 is subsequently subjected to sufficient compression to reduce the height of the column to about one fourth of its initial height, whereupon the elevational section will take a form similar to that shown in Fig. 2. The entire column may be considered to have been compressed uniformly in each of the layers. For the ordinary purposes for which the products of the present invention may be utilized, actual uniformity of compression in the several layers is not essential, and any variation from actual uniform compression is of no significance.

The important feature at this point is that a body of pure fluoro-carbon resin, such as Teflon 11, is now integrally bonded in a unified body structure, with a portion of its body, in a predetermined transition region, containing a gradually or equivalently preponderant content of glass or ceramic, with the minor proportion of Teflon serving as a cohesive bonding medium with the pure Teflon body, so that as a result, one surface of the Teflon body is so preponderantly glass or ceramic that a glass or ceramic layer may be readily directly cemented or bonded thereto, for mechanical connection, or for mechanical sealing to withstand vacuum, or for mechanical structural support.

The depth of the Teflon material in the body is not limited to any specific dimension, but may be varied according to the dimension that is ultimately desired, for the structure or operation required. It may be shallow or deep. Fig. 1 is merely illustrative. After the quantity of powder is compressed to the condition shown in Fig. 2, which corresponds substantially to the desired final dimension, the compressed unit body is then sintered at a temperature of about 700 degrees Fahrenheit.

The specific gravity of Teflon is within the range of 2.1 to 2.3, and it is therefore considerably lighter than any of the materials which might be mixed with the Teflon, in accordance with this invention, to provide an outer glass or ceramic surface. During the compression of the molding operation, therefore, even though the mixture of the top layer would be homogeneously distributed, the glass or ceramic particles or other material that might be employed, might be pressed downward somewhat from the top surface plane. Under such conditions, it is quite possible that the top surface of the molded body would not be uniformly and continuously glass or ceramic. However, the superposed outer layer, upon being heated to fusion, will flow sufficiently to join the particles held in the Teflon body slightly subjacent the surface plane, and thereby take root to bond to those particles.

Figure 4 shows a structural unit 20 consisting of a resin body 21, of Teflon for example, having a modified transition region 22 which is made up of a homogeneous mixed mass of the Teflon and a ceramic, or glass, or any other suitable insulating material, and having a top surface layer 23 of water glass that has been baked to provide a hard, glazed surface to the Teflon body. A metal conductor 24 extends through the body of the support or insulator 20 thus formed. The conductor 24 is supported by the entire body 20, but is held rigidly by the glass layer 23 sufficiently to provide a rigid support for the conductor 24 at the circular base region where it is engaged by the glass layer 23.

The wire conductor 24 may of course be applied at any time, but preferably before the outer glass layer 23 is formed. The conductor will ordinarily be inserted in the modified Teflon body after that body has been compressed to the condition indicated in Fig. 2, for example, and sintered. The material that is to constitute the rigid surface layer 23 is preferably applied after the wire or metal rod or conductor is inserted or threaded through the body in which it is to be supported.

The metal conductor should preferably be of a material having a temperature coefficient corresponding to that of the glass, or of any other material, which may be utilized to form the top rigid layer 23.

Any of the metals may be used that are commercially available and presently being utilized, for applications where the metal is to be in contact with the glass and where heat may be generated by the current conducted by the wire, or where the ambient temperature to which the supporting insulator may be subjected during normal operating conditions, will create a temperature cycle over a substantial temperature range.

In the application shown in Fig. 4, the material used for the top rigid surface 23, whether it be water glass or powdered glass or ceramic material, will wet to the surface of the metal conductor 24 and in itself will provide both a hermetic seal and a rigid contact to support the conductor at that region, fixed against casual undesired movement.

The glass surface 23 will itself accept any siliceous cement or any resinous base cement, that will form a strongly cohesive bond to other articles such as glass, wood, or metal. Thus, by the modification of the fluorocarbon base by the addition of the siliceous material, to form the transition region 22, which can accept the cement 23, the base, even Teflon resin, for example, can readily be cemented and bonded and joined directly to any other material to which the cement will adhere, notwithstanding the fact that the fluoro-resin base itself would not directly accept a similar bonding or cementing material on a conventionally finished fluoro-resin surface. Thus, for example, Teflon, or Kel-F, would not readily accept any of the siliceous or resinous cements directly on their surfaces. But they may be modified by the addition of a siliceous or resinous material corresponding to the base material of either type of cement, so that a transition region may be formed at the surface of the fluoro-carbon resin base where it is desired to attach some other material to that fluoro-carbon base.

In Fig. 5 is illustrated by way of example, a construction in which a metallic element such as a pipe or bracket 30 is attached to and supported on a supporting wall or base 31 of glass, by a coupling body consisting of a fluoro-resin base 32. The front surface 33 and the rear surface 34 of the coupling body have been treated in accordance with the method illustrated in Figs. 1, 2, and 3, and as shown in the finished element 4, so that a transition region is established to which has been applied a material, siliceous or resinous, corresponding to the basic nature of the bonding cement that is to be used to attach the coupling body in one case to the metal 30, and in the other case to the glass base 31.

Another specific application to which this invention is advantageously applied is shown in Figs. 6 and 7. As there illustrated, a sealing cap, or header 40, is applied to close and hermetically seal a can that is to contain a relay and a contact-switching assembly controlled thereby. The details of the relay and of the operating mechanism are not necessary for the purpose of this invention, it being sufficient to indicate the manner in which the stationary switch contact elements are supported by the header, and how a movable contact is disposed to operatively engage one or the other of the stationary contacts of one set.

As shown in Fig. 6, a header 40 of the type referred to may include several switch units, each as represented by the elements of group 41 within the dotted triangle 42 with corresponding groups disposed symmetrically around the disc. A pair of central terminals 43 and 44 serve to conduct the operating current to the coil of the relay. The relay, when energized, operates a movable armature, for example, which will then actuate a plurality of movable contact supports, such as indicated by the flexible resilient metallic ribbon 45 in Fig. 6. That ribbon 45 supports a movable contact 46 to engage with either one of two stationary contacts 47 and 48. In the operation of such a device, where so many contact elements are disposed in a relatively small space, it is extremely important that the contact-supporting elements shall be held rigidly fixed in position under all conditions. Since the body of the insulating disc is a Teflon resin, for example, and is relatively resilient, some relative movement between the contact-supporting elements could possibly occur during a switching operation, and that would be undesirable. However, by the adition of a siliceous or glass surface layer 23, as in Fig. 4, the top surface of the Teflon body acquires sufficient rigidity to support the contact elements against relative movement. Dimensional stability between the contact elements is thus assured. Since the Teflon body 40 is made as a disc, it is obvious that the undersurface of the disc may be treated in the same manner to provide a siliceous surface on the undersurface of the Teflon disc as well as on the upper surface.

This invention thus contemplates adding to a quantity of fluoro-carbon resin as a base, a modifying material which will be compatible with, and which will form a bond with, a pre-selected cementing or bonding material. The modifying material may be the cementing or bonding material itself, or a material that is compatible with the cementing and bonding material. Thus any material may be utilized as a modifier for disposition in the fluoro-carbon resin body, if its characteristics are such as to form a strong bond to a cementing or bonding material to be applied to the surface when modified and finished.

Thus, where there is no objection to the presence of metal at the surface of the fluoro-carbon resin, and a cementing or bonding material will be used that forms a strong bond to a metal, or to a particular metal, then that metal in powdered or comminuted form may be disposed in the fluoro-carbon resin quantity in appropriately graded proportion, to establish a maximum proportion of the metal at the surface of the finished resin body when ultimately formed.

On the other hand, when metal is objectionable in, or on the surface of the resin body, the modifying material may be any suitable material having insulation characteristics and that is compatible with the cement or bonding material to be used.

The invention is thus not limited to any specific additive or modifying material, but may be practiced by utilizing any suitable material with appropriate characteristics and that will be compatible with the cement or bonding material to be used.

What is claimed is:

1. An article of manufacture to serve as a header for a container, and for rigidly supporting a plurality of electrical conductors as terminal contacts of a switching device, said article consisting of a base of a flexible fluoro-carbon resin having the conductors extending through an outer surface thereof, and having a surface layer of glass on said outer surface to provide the rigidity for holding the conductors fixed in place against relative movement otherwise possible due to the flexibility of the resin.

2. The method of forming a fluoro-carbon resin body with an integrally bonded glass surface, which comprises layering a quantity of fluoro-resin powder with a mix of resin and powdered glass to establish a predetermined surface area, compressing the entire quantity to appropriate dimension, and sintering at sintering temperature for the resin, covering the surface area of the mixture region with a layer of powdered glass, and then firing the glass to its fusing temperature to cause the glass to bond to said surface area.

3. An article of manufacture comprising a plastic component of a polymer of tetrafluoroethylene and a ceramic component comprising finely divided powdered glass particles, said article having a major proportion of the ceramic component at a surface thereof and throughout a transition region adjacent said surface having a homogeneous mixture of said components with a decreasing proportion of the ceramic component and an increasing proportion of the plastic component to a subsurface region where the plastic component is 100%, and a layer of glass integrally bonded to said surface made up of a major portion of said powdered glass.

4. The article of manufacture of claim 3 in which electrical conductors extend through the article in the region where said glass layer is integrally bonded to said surface, whereby said layer provides a rigid bracing for said conductors.

5. An article of manufacture having a body portion formed from a fluorocarbon resin selected from the group consisting of tetrafluoroethylene and monochlorotrifluoroethylene, said resin being a resilient material, a ceramic component comprising finely divided non-metallic non-resilient ceramic particles, said body portion only in a region directly subjacent a selected surface thereof limited depth having present a mixture of said non-yielding ceramic component and said resin, said ceramic component being present in increased proportion at said surface of said selected region, said ceramic component at said surface of said region being at least 70% by weight of said resin thereby to impart rigidity to said region without affecting the resiliency of said resin below said region subjacent said selected surface, and a top layer consisting substantially entirely of said rigid ceramic particles bonded to said selected surface region containing said rigid ceramic particles.

6. An article of manufacture having a body portion formed from a polymer of tetrafluoroethylene, said body portion only in a region directly subjacent a selected surface thereof of limited depth having present a mixture of said polymer and rigid non-metallic ceramic particles, said particles throughout said subjacent region having an increasing proportion toward said surface of said particles relative to said polymer and at the surface of that region having said rigid particles present in amount in excess of about 70% by weight of said polymer thereby to impart rigidity to said region, and a surface layer bonded to said region and consisting substantially entirely of said rigid ceramic particles.

References Cited in the file of this patent

UNITED STATES PATENTS

| | | |
|---|---|---|
| 483,806 | Hull | Oct. 4, 1892 |
| 1,185,601 | Miller | May 30, 1916 |
| 1,922,673 | Filippo | Aug. 15, 1933 |
| 2,030,185 | Rose, Jr. | Feb. 11, 1936 |
| 2,192,892 | Brandt | Mar. 12, 1940 |
| 2,247,208 | Schorger | June 24, 1941 |
| 2,400,099 | Brubacker et al. | May 14, 1946 |
| 2,413,498 | Hill | Dec. 31, 1946 |
| 2,427,183 | Berry | Sept. 9, 1947 |
| 2,484,484 | Berry | Oct. 11, 1949 |
| 2,485,691 | Bogese | Oct. 25, 1949 |
| 2,488,446 | Swiss | Nov. 14, 1949 |
| 2,531,007 | Strom et al. | Nov. 21, 1950 |
| 2,571,608 | Plagge | Oct. 16, 1951 |
| 2,633,481 | Meeks | Mar. 31, 1953 |
| 2,645,819 | Pouzet | July 21, 1953 |